United States Patent
Gentry

[11] Patent Number: 5,818,354
[45] Date of Patent: Oct. 6, 1998

[54] ANIMAL MONITORING SYSTEM

[76] Inventor: Timothy G. Gentry, 16455 Country Rd. 13, Smithville, Mo. 64089

[21] Appl. No.: 845,909

[22] Filed: Apr. 28, 1997

[51] Int. Cl.$^6$ ...................................................... H04B 5/00
[52] U.S. Cl. ............................... 340/870.16; 340/870.07; 340/573; 340/870.09; 340/539; 119/220
[58] Field of Search ..................... 340/870.16, 870.07, 340/870.05, 870.09, 573, 539, 825.54, 825.72; 119/220, 715; 600/549; 128/903

[56] References Cited

U.S. PATENT DOCUMENTS

| | | | |
|---|---|---|---|
| 4,038,976 | 8/1977 | Hardy | 600/503 |
| 4,475,481 | 10/1984 | Carroll | 119/51 R |
| 4,617,876 | 10/1986 | Hayes | 119/155 |
| 4,652,261 | 3/1987 | Mech . | |
| 4,898,119 | 2/1990 | Tsai | 119/29 |
| 5,161,485 | 11/1992 | McDade | 119/106 |
| 5,204,670 | 4/1993 | Stinton | 340/825.54 |
| 5,335,664 | 8/1994 | Nagashima | 600/508 |
| 5,425,330 | 6/1995 | Touchton et al. | 119/721 |
| 5,438,983 | 8/1995 | Falcone | 600/301 |
| 5,481,262 | 1/1996 | Urbas | 340/870.17 |
| 5,559,497 | 9/1996 | Hong | 340/573 |

*Primary Examiner*—Michael Horabik
*Assistant Examiner*—Albert K. Wong
*Attorney, Agent, or Firm*—Henderson & Sturm

[57] ABSTRACT

An animal collar with a pair of sensors for detecting the heartrate and temperature of the animal, an encoder for encoding the information for a specific animal, and a radio frequency transmitter for relaying the information to a receiver contained within a handheld monitor. The monitor decodes the information and displays it on a liquid crystal or light emitting diode display. The receiver may also include a keyboard for selecting specific codes for the decoder when more than one animal is to be monitored. A preferred embodiment of the invention utilizes a coded signal, transmitted by the handheld monitor and received by the collar device, for turning the collar transmitter on and off so as to conserve power. The handheld monitor also includes an alarm beeper or vibrator to alert the person monitoring the animal of a dangerous situation.

5 Claims, 4 Drawing Sheets

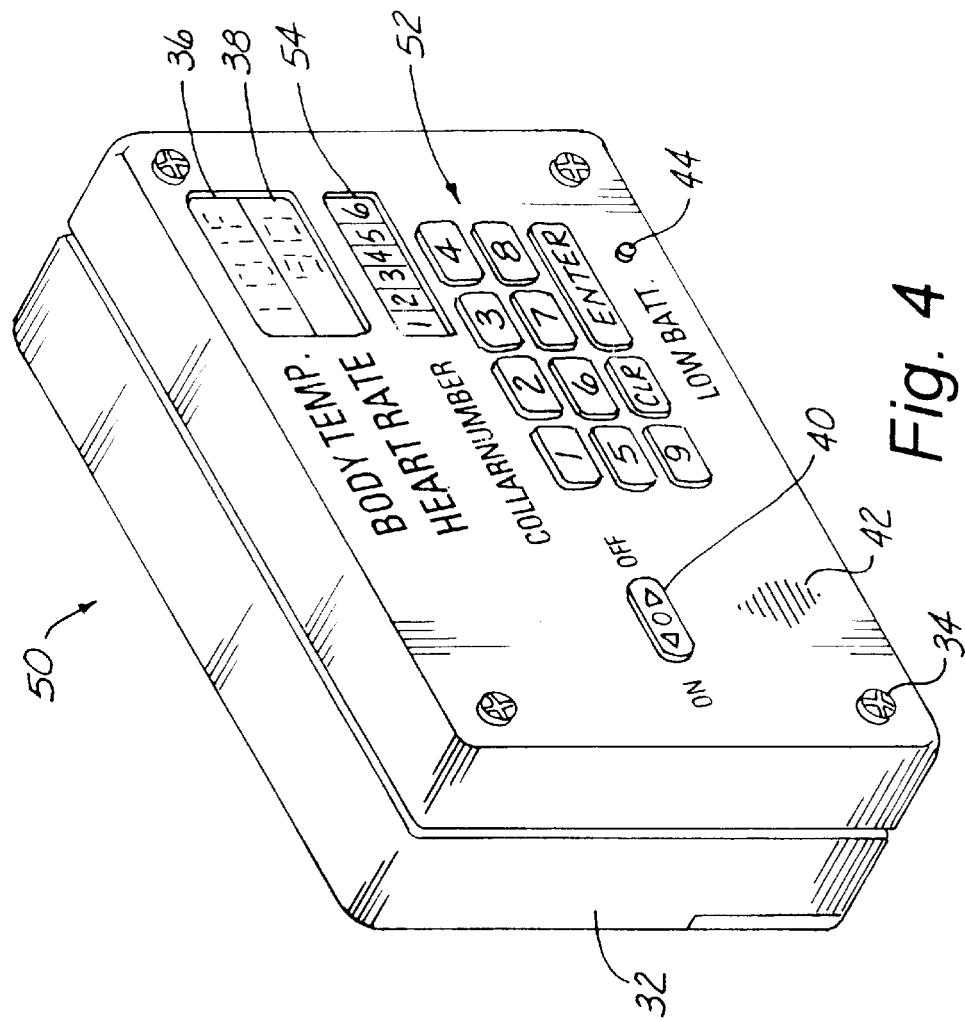
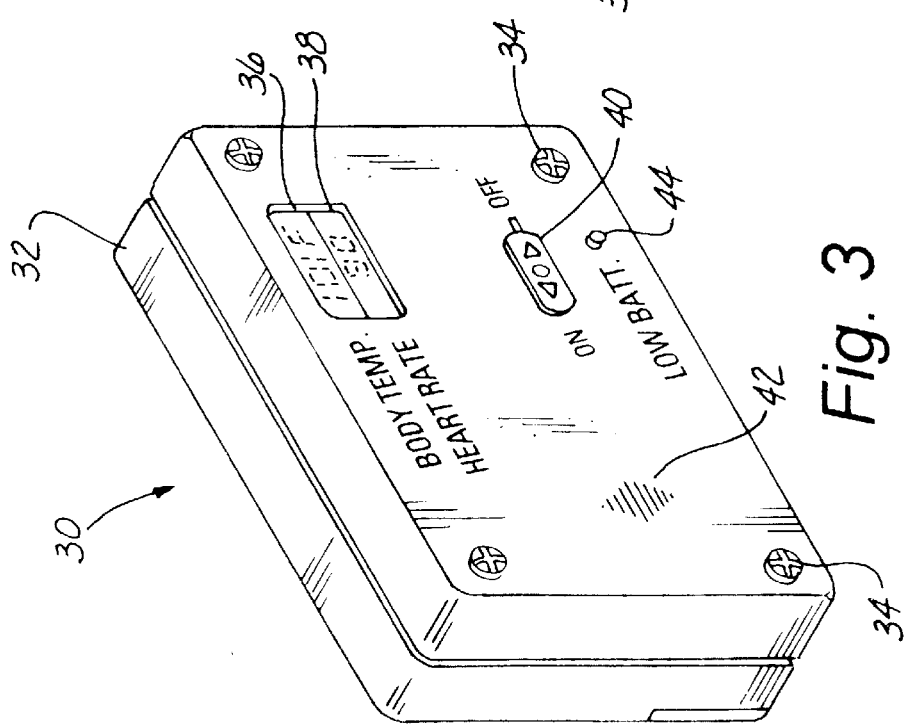

ANIMAL MONITORING SYSTEM

BACKGROUND OF THE INVENTION

1. Field of the Invention

This invention relates to devices for monitoring physical attributes such as temperature and heart rate, and more particularly to remotely operated monitoring devices for animals which are capable of receiving the information via radio frequency transmissions.

2. Description of the Related Art

Electric shock collars for controlling animals are well known in the art. These devices are typically manually actuated as for use in training hunting dogs, actuated by a buried wire in animal containment situations, or actuated by the bark of the dog when attempting to stop the animal from barking. The prior art also discloses animal identification systems which transmit encoded data so as to facilitate monitoring the feeding, weighing, etc. of cattle, pigs and other domestic animals. Devices are also available which may be secured around an athlete's chest and which transmit a low power signal to a receiver worn on the athletes wrist whereby he may monitor his heart rate.

While all of the aforementioned prior art constructions are adequate for the basic purpose and function for which they have been specifically designed, a device for remotely monitoring the physical well being of multiple animals is desirable, particularly over an extended period of time.

BRIEF SUMMARY OF THE INVENTION

Briefly stated, the animal monitoring system that forms the basis of the present invention comprises an animal collar with a pair of sensors for detecting the heart rate and temperature of the animal, an encoder for encoding the information for a specific animal, and a radio frequency transmitter for relaying the information to a receiver contained within a handheld monitor. The monitor decodes the information and displays it on a liquid crystal or light emitting diode display. The receiver may also include a keyboard for selecting specific codes for the decoder when more than one animal is to be monitored. A preferred embodiment of the invention utilizes a coded signal, transmitted by the handheld monitor and received by the collar device, for turning the collar transmitter on and off so as to conserve power. The handheld monitor also includes an alarm beeper or vibrator to alert the person monitoring the animal of a dangerous situation.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 3 is a perspective view of a single code handheld monitor of the present invention;

FIG. 4 is a perspective view of a multiple code handheld monitor;

DETAILED DESCRIPTION OF THE INVENTION

Figure 1:
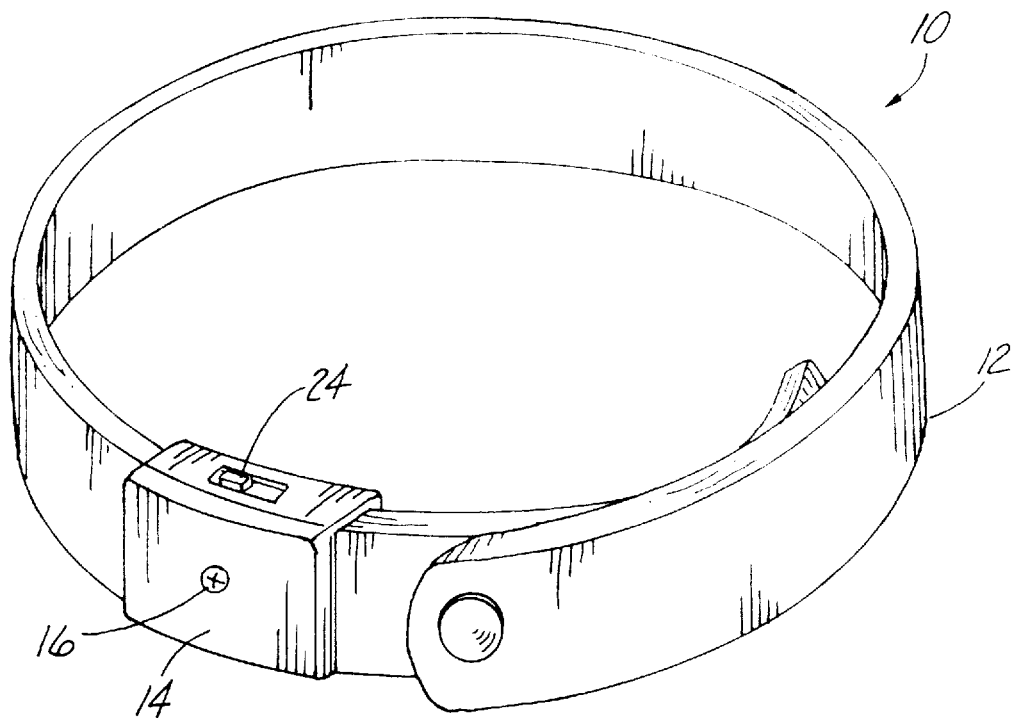
FIG. 1 is a perspective view of the animal collar of the present invention.

Referring now to the drawings, wherein like reference numerals designate identical or corresponding parts throughout the several views, FIG. 1 shows the animal collar 10 of the invention which is comprised of a standard animal collar 12, made of leather or other sturdy material, and the collar electronic unit 14 which includes a two-piece plastic housing held together and secured upon the collar with a screw 16.

Figure 2:
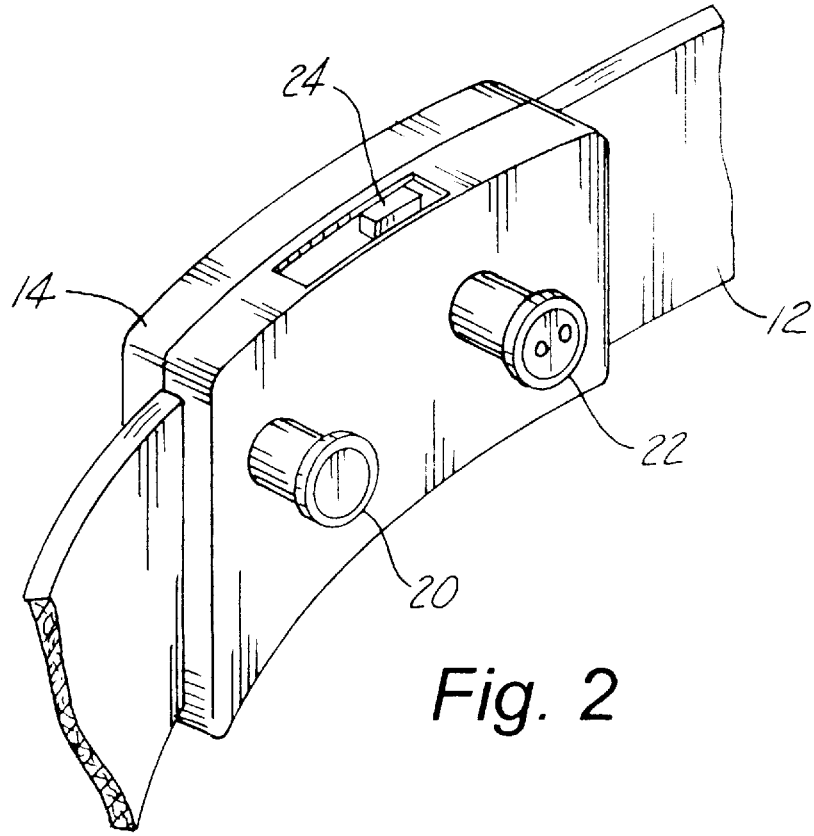
FIG. 2 is a perspective view of the inner side of the collar electronic unit showing the temperature and heart rate sensors.

FIG. 2 depicts the inner side of the collar electronic unit 14 which rests against the animal's neck and shows the temperature sensor 20 and heart rate sensor 22. The temperature sensor 20 utilizes a thermocouple or thermistor to provide a signal to the collar electronics which is dependent on the body temperature of the animal. The heart rate sensor 22 functions by measuring the Galvanic activity of the skin of the animal which is related to the electrical signals that control the beating of the heart. Also shown is the collar electronic unit power switch 24.

A single code handheld monitor 30 is depicted in FIG. 3 and is seen to comprise a two-piece plastic housing 32 held together by four screws 34. The monitor 30 presents a liquid-crystal or light-emitting diode display of the animal's body temperature 36 and heart rate 38 which are displayed when the monitor power switch 40 is turned on. The monitor also incorporates an audible and vibrator alarm system 42 to signal the animal's owner of a dangerous temperature or heartrate situation. A low battery warning light 44 is also provided. As will be further described below, the single code monitor 30 utilizes an internal dip switch encoder, similar to that used in automatic garage door openers, which is set to the same code as the corresponding dip switch encoder within the collar electronic unit 14. This, of course, is to prevent the mixing of signals when multiple units are used within the same vicinity.

A multiple code handheld monitor 50 is depicted in FIG. 4 and while similar to the single code unit just described, additionally provides a code keyboard 52 and collar number readout 54. The code keyboard 52 allows for electronically entering different codes into the monitor electronics to permit monitoring multiple animals having different codes set into each of their collar electronics. The collar number reading 54 provides a convenient identification of which particular animal is being monitored at any given time.

Figure 5:
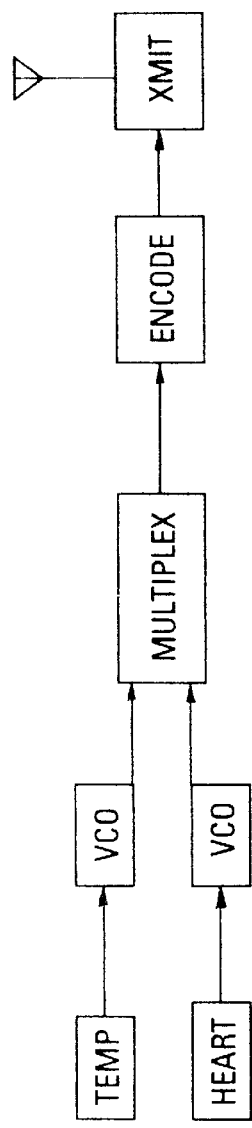
FIG. 5 is a block diagram of a first embodiment of the collar electronic unit of the invention.

A block diagram of a first embodiment of the collar electronic unit of FIG. 2 is shown in FIG. 5 and is seen to comprise the temperature sensor 20 and heart rate sensor 22 which each provide a signal to a voltage controlled oscillator 58. The signals from the voltage controlled oscillators 58 are then combined by a multiplexer 60. The multiplexed signal is then encoded by the preset encoder 62, set to the particular animal's code, and sent to a low power radio frequency transmitter 64.

Figure 6:
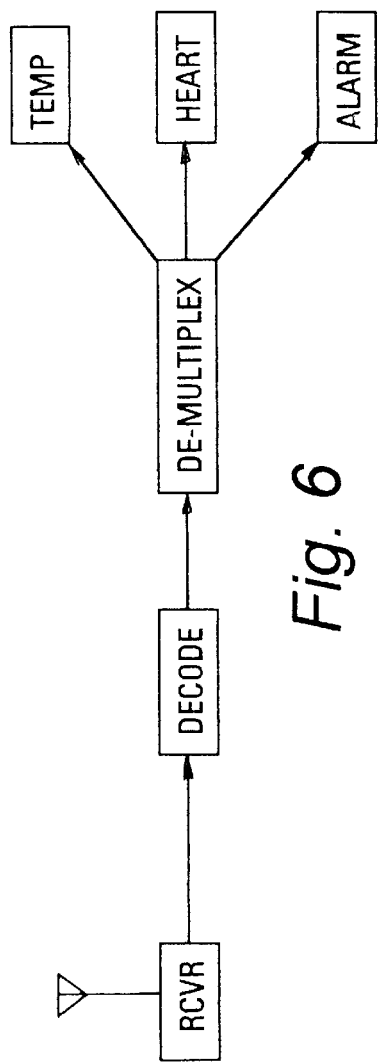
FIG. 6 is a block diagram of a single code handheld monitor electronic unit of the invention.

A block diagram of the single code monitor of FIG. 3 is depicted in FIG. 6 and comprises a radio frequency receiver

70 which receives the encoded signal from the collar transmitter 64. The received signal is then decoded by a preset decoder 72, separated by a demultiplexer 74, and sent to the temperature display 36, the heart rate display 38, and the alarm circuit 42.

Figure 7:
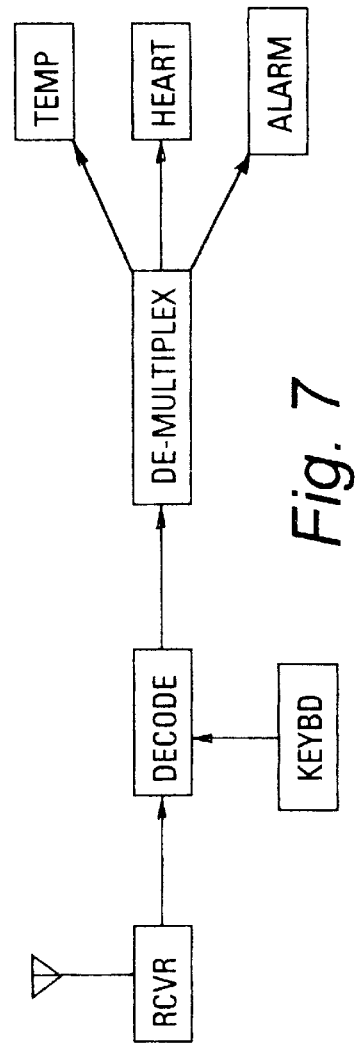
FIG. 7 is a block diagram of a multiple code handheld monitor electronic unit.

FIG. 7 depicts the multiple code monitor of FIG. 4 which includes the code keyboard 52 for electronically inputting various codes into the decoder 72 for monitoring several different animals having individual codes in their collar electronic units.

Figure 8:
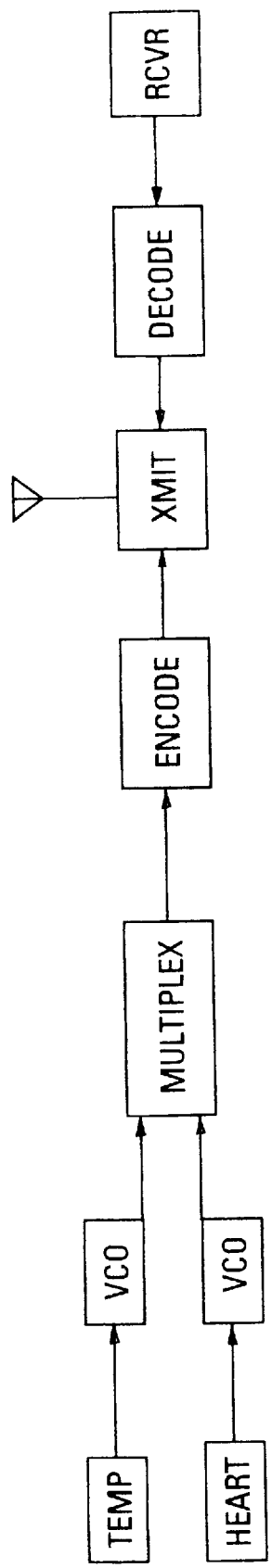
FIG. 8 is a block diagram of a second embodiment of the collar electronic unit.
Figure 9:
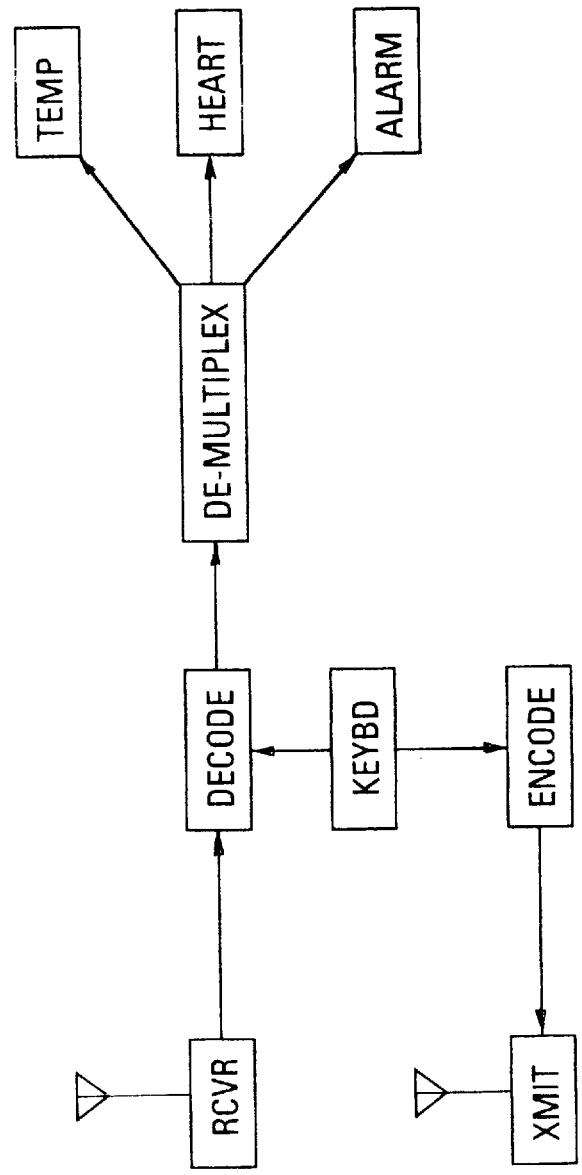
FIG. 9 is a block diagram of a second embodiment of the multiple code handheld monitor electronic unit.

A second embodiment of the invention is depicted in FIGS. 8 and 9. This embodiment, which provides for selectively turning individual collar transmitters 64 on and off so as to save collar battery power and to allow use of the device in aircraft, adds a radiofrequency receiver 80 and a decoder 82 to the collar electronic unit (FIG. 8) and a radio frequency transmitter 84 and encoder 86 to the monitor (FIG. 9). After the monitor is turned on, a code is entered into the keyboard 52 identifying a particular animal. A coded signal is then transmitted by the monitor transmitter 84 and received by all collar receivers 80 in the immediate vicinity which are turned on. The collar receivers 80 pass the signal to their respective decoder 82, but only the selected collar is able to decode the signal which then switches the collar transmitter 64 on. When the monitor is turned off, a signal is no longer received by the collar receiver 80 and that collar's transmitter 64 is turned off.

Although several exemplary embodiments of the invention has been described in detail above, those skilled in the art will readily appreciate that many modifications are possible without materially departing from the novel teachings and advantages of this invention. Accordingly, all such modifications are intended to be included within the scope of this invention In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus for remotely monitoring the health of a plurality of domestic animals consisting of:
    (a) a plurality of animal collars wherein each of said plurality of domestic animals is provided with an animal collar having a first sensor for measuring and providing a signal based upon a first physical characteristic of an animal upon which said collar is secured, said collar further including an encoder for encoding said signal and a transmitter for transmitting said encoded signal; which includes an animal identification code individually assigned to each one of said plurality of domestic animals; a second sensor for measuring and providing a second signal based upon a second physical characteristic of said animal, and a multiplexer for multiplexing said first signal and said second signal before encoding; and
    (b) a monitor having a receiver for receiving said transmitted encoded signals, a decoder for decoding said encoded signals, and a display for displaying said decoded signals; a demultiplexer for demultiplexing said first signal and said second signal after decoding and a display for displaying said decoded signals including the animal identification code.

2. The apparatus as claim 1 wherein said monitor further includes a warning alarm activated by said decoded signal.

3. The apparatus of claim 2 wherein said monitor further includes a keyboard for selecting one of a plurality of codes for said decoder.

4. The apparatus of claim 3 wherein said monitor further includes a display which is dependent on said selected code.

5. The apparatus of claim 4 wherein said monitor further includes means for encoding and transmitting an on/off signal, and said collar further includes means for receiving and decoding said on/off signal and applying said signal to said collar transmitter.

* * * * *